(12) United States Patent
Hoshi

(10) Patent No.: US 8,271,766 B2
(45) Date of Patent: Sep. 18, 2012

(54) INTENTIONALLY DELAYING EXECUTION OF A COPY INSTRUCTION TO ACHIEVE SIMULTANEOUS EXECUTION WITH A SUBSEQUENT, NON-ADJACENT WRITE INSTRUCTION

(75) Inventor: Noritaka Hoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 665 days.

(21) Appl. No.: 11/915,461

(22) PCT Filed: May 18, 2006

(86) PCT No.: PCT/JP2006/309952
§ 371 (c)(1),
(2), (4) Date: Nov. 26, 2007

(87) PCT Pub. No.: WO2006/126449
PCT Pub. Date: Nov. 30, 2006

(65) Prior Publication Data
US 2009/0049283 A1    Feb. 19, 2009

(30) Foreign Application Priority Data
May 26, 2005    (JP) .................................. 2005-153427

(51) Int. Cl.
G06F 9/30 (2006.01)
G06F 9/40 (2006.01)
G06F 7/38 (2006.01)
G06F 9/00 (2006.01)
G06F 9/44 (2006.01)

(52) U.S. Cl. .................... 712/225; 712/217; 712/218

(58) Field of Classification Search ................. 712/225, 712/217
See application file for complete search history.

(56) References Cited

U.S. PATENT DOCUMENTS

| 5,131,086 A | | 7/1992 | Circello et al. |
| 5,867,724 A | | 2/1999 | McMahon |
| 5,878,252 A | * | 3/1999 | Lynch et al. .................. 712/225 |
| 5,881,308 A | * | 3/1999 | Dwyer, III ...................... 712/23 |

(Continued)

FOREIGN PATENT DOCUMENTS
JP    60144874    7/1985
(Continued)

OTHER PUBLICATIONS

Supplementary European Serach Report for EP 06 74 6620 completed on Dec. 18, 2008.

(Continued)

*Primary Examiner* — David Huisman
*Assistant Examiner* — William Partridge

(57) ABSTRACT

An information processing device including registers (105) for holding data and an operation device (102) for executing arithmetic and logic operations on input/output data held in the register. The information processing device can issue an inter-register copy instruction for instructing data held in one register to be copied to another register. The information processing device further includes a copy information holding device (113) for reserving for execution of a data copy operation by the inter-register copy instruction from a control unit (108) so as to execute the actual copy operation simultaneously with the succeeding instruction to hide the execution time of the copy operation. Thus, in the inter-register copy instruction execution phase, a reservation for a data copy operation is stored in the copy information holding device so that the execution phase is completed without performing the actual data copy operation.

2 Claims, 13 Drawing Sheets

U.S. PATENT DOCUMENTS

| | | | |
|---|---|---|---|
| 6,393,555 B1 * | 5/2002 | Meier et al. | 712/222 |
| 2003/0188127 A1 * | 10/2003 | So | 712/34 |

FOREIGN PATENT DOCUMENTS

| | | |
|---|---|---|
| JP | 62065133 | 3/1987 |
| JP | 01296345 | 11/1989 |
| JP | 03037722 | 2/1991 |
| JP | 07219769 | 8/1995 |
| JP | 10105399 | 4/1998 |
| JP | 2003091414 | 3/2003 |

OTHER PUBLICATIONS

PCT/JP2006/309952 International Search Report, mailed Jun. 27, 2006.

* cited by examiner

FIG. 2
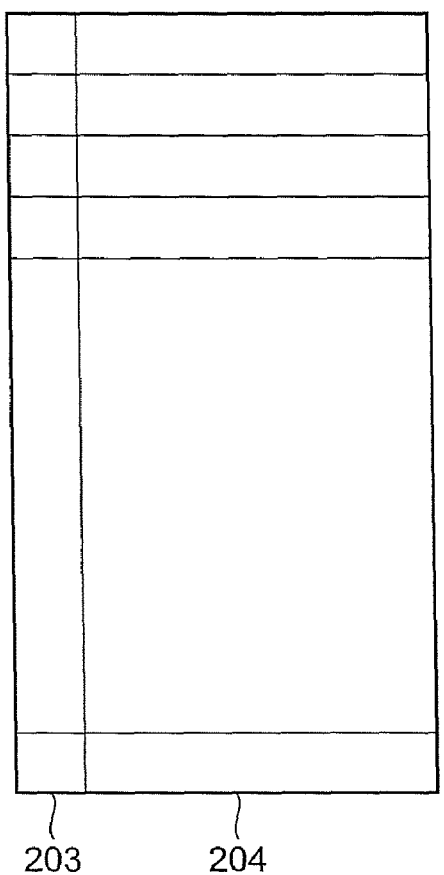
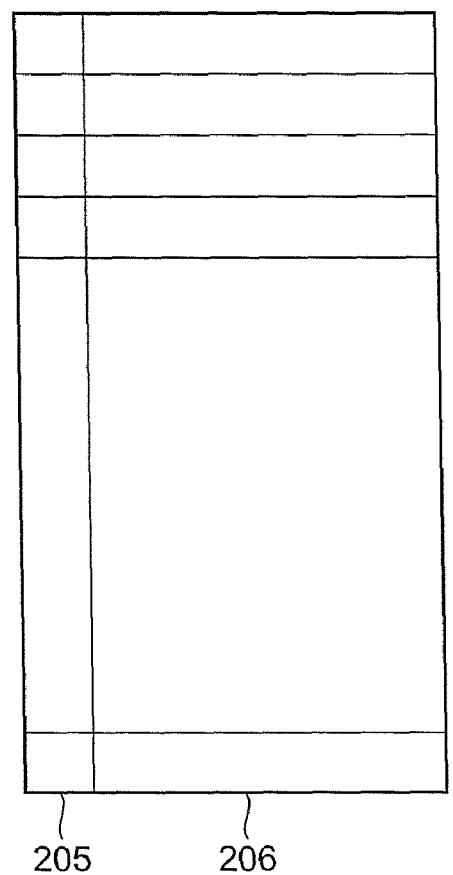
201   202
203  204   205  206

FIG. 4

(a)
⋮
(1) MOV VR1 → VR2
⋮
(2) ADD VR2 + VR3 → VR4
⋮

(b)
⋮
(1) MOV VR1 → VR2
⋮
(2) ADD VR3 + VR4 → VR1
⋮

(c)
⋮
(1) MOV VR1 → VR2
⋮
(2) ADDM VR3 + VR4 → VR2
⋮

| | 201 | | 202 | |
|---|---|---|---|---|
| VR1 | 0 | | 0 | |
| VR2 | 0 | | 0 | |
| VR3 | 0 | | 0 | |
| VR4 | 0 | | 0 | |

⇩

(1) MOV VR1 → VR2

⇩

(b)

| | 203 | 204 | 205 | 206 |
|---|---|---|---|---|
| VR1 | 1 | VR2 | 0 | |
| VR2 | 0 | | 1 | VR1 |
| VR3 | 0 | | 0 | |
| VR4 | 0 | | 0 | |

(a)
⋮
(1) MOV VR1 → VR2
⋮
(2) ADD VR3 + VR4 → VR1
⋮

(b)
⋮
(1) MOV VR1 → VR2
⋮
(2) ADDM VR3 + VR4 → VR1
⋮

FIG. 15          PRIOR ART (a)
1501  1502    1503 1504 1505

| 0 | W | | 1 | | 0 | 0 | 0 | R0(W) |
| 1 | X | | 1 | | 1 | 0 | 0 | R1(X) |
| 2 | Y | | 1 | | 2 | 0 | 0 | R2(Y) |
| 3 | Z | | 1 | | 3 | 0 | 0 | R3(Z) |

(1) MOV R2 → R1

(b)

| 0 | W | | 1 | | 0 | 0 | 0 | R0(W) |
| 1 | X | | 0 | | 2 | 1 | 0 | R1(Y) |
| 2 | Y | | 1 | | 2 | 0 | 1 | R2(Y) |
| 3 | Z | | 1 | | 3 | 0 | 0 | R3(Z) |

(2) ADD R0 + R3 → R2

(c)

| 0 | W | | 1 | | 0 | 0 | 0 | R0(W) |
| 1 | W+Z | | 1 | | 2 | 1 | 0 | R1(X) |
| 2 | Y | | 1 | | 1 | 1 | 0 | R2(W+Z) |
| 3 | Z | | 1 | | 3 | 0 | 0 | R3(Z) |

INTENTIONALLY DELAYING EXECUTION OF A COPY INSTRUCTION TO ACHIEVE SIMULTANEOUS EXECUTION WITH A SUBSEQUENT, NON-ADJACENT WRITE INSTRUCTION

TECHNICAL FIELD

The present invention relates to an information processing device having registers, capable of sequentially executing arithmetic and logic operations among specified registers, and particularly to the technology to speed up by hiding time for inter-register copy operations by execution time of arithmetic and logic operations.

BACKGROUND ART

A high-speed operation of a processor in an information processing device is made possible by internally providing the processor with high-speed accessible small-capacity registers, and by executing an arithmetic and logic operation among the register, and by returning results from the arithmetic and logic operations back to the registers to be held therein. The operations of the processor are controlled by instructions so as to sequentially interpret and execute the instructions.

An example of a conventional processor is shown in FIG. 14. The control unit 108 sequentially decodes and executes instructions read from the instruction cache 109. The operation device 102, with its input and output ports being connected to the register file 101, receives input data from a specified registers 105 in accordance with an instruction from the control unit 108 and writes results from the arithmetic and logic operations onto the specified registers 105. Moreover, in some cases, the control unit 108 instructs data to be transferred between the registers 105 and the main memory device 112. In this case, the control unit 108 performs processing of reading data via the load buffer 111 from the main memory device 112 to write the data onto specified registers 105, or data via the store buffer 110 from the registers 105 to write the data onto the main memory device 112.

In a processor, an inter-register copy instruction is often executed in order to create a duplicate value held in a register or to use a value held in a register during the next iteration process or another subroutines. The instruction is for writing the same value as held in a register (source register) onto another register (destination register). The inter-register copy instruction is generally to be inserted and issued by a complier due to a limitation in terms of an architecture and the step of the insertion and issuance is part of time-wasting processing from a user's viewpoint. In the actual operation, an arithmetic and logic operation device is not used and it is therefore desirous that its execution time is reduced to a minimum.

FIRST PRIOR ART

Conventionally, some proposals are provided as a means to reduce time for copying among registers specified by an instruction. A conventional representative technology is to achieve operations of copying data in a pseudo manner by rewriting a pointer used for referring to a register without actually copying a value of a register.

The Japanese Patent Application Laid-open No. Hei 3-37722 (Patent Reference 1) discloses the technology to execute an inter-register copy instruction by rewriting a label associated with each register. This technology is a kind of a register renaming function by which a name of a logical register specified by an instruction is converted into a name of a physical register storing a data entity.

By referring to FIG. 15, outlines of the conventional technology to reduce time for an inter-register copying are described. The register file 1501 stores a data entity and a valid/invalid recording device 1502 is set to "1" when data held in a corresponding register is valid. A register cord 1503 indicates a location of a data entity of a register specified by an instruction in the register file 1501. If a reference flag 1504 is set to "1", a register having a corresponding number refers to another location in the register file 1501. If a referenced flag 1505 is set to "1", data in the corresponding register file 1501 is referred to by another register.

When an instruction (1) for an inter-register copy operation is issued, as shown in the state (b), the reference flag 1504 of the register R1 is set to "1" and the register cord 1503 is set to "2". This causes the register R1 to refer to the location "2" in the register file 1501 and the execution of the instruction for the inter-register copy operation to be completed (at the same time, the valid/invalid recording device 1502 and the referenced flag 1505 have been updated accordingly).

When an instruction (2) for writing data onto the register R2 is provided, an entry in which the valid/invalid recording device 1502 is set to "0" in the register file 1501 is detected and this entry is associated with the register R2. In the state (c), the result from the arithmetic and logic operations is written at the location "1" in the register file 1501, which indicates that the register code 1503 in the register R2 refers to "1". Thus, when an instruction for updating data to be copied is issued, another entity is prepared for the use of a register to be updated and original data continues to be held in a register not to be updated.

The technology in which, as described above, at a time of issuance of an instruction for an inter-register copy operation, copying operations are achieved only by replacing a label with a new label without an actual copy operation is called the "first prior art" hereinafter.

SECOND PRIOR ART

In a vector processor to process large amounts of data at once, a problem of time required for an inter-register copy operation is serious. As a means for reducing the execution time for the inter-register copy operation, technology is disclosed in Japanese Patent Application Laid-open No. Sho 60-144874 (Patent Reference No. 2), in which a vector data processing device is proposed which has the first vector register coupled to the operation device in a fixed manner and the second vector register not directly coupled to the operation device. In the disclosed vector data processing device, by designating both the first and second registers as destination registers at a time of the execution of instructions, results from arithmetic and logic operations can be written onto the two vector registers at the same time. This processing is equivalent to simultaneous executions of the instruction for arithmetic and logic operations and the inter-register copy operation using the results from the arithmetic and logic operation as a source, thereby reducing time for the execution of the instruction for inter-register copy operations.

The technology in which time for the execution of copying data is hidden, as described above, by simultaneously performing one instruction for the inter-register copy operation and another instruction according to program instructions is called the "second prior art" hereinafter. As technology similar to the above second prior art, an information processing device equipped with an arithmetic and logic operation device having two inputs and two outputs and configured to simultaneously execute a plurality of move instructions is disclosed (in, for example, Japanese Patent Application Laid-open No. Hei 07-219769 [Patent Reference 3]).

THIRD PRIOR ART

Also, Japanese Patent Application Laid-open No. Hei 1-296345 (Patent Reference 4) discloses the technology to simultaneously perform an arithmetic and logic operation and data copying operation when both a preceding arithmetic and logic operation instruction and a succeeding inter-register copy instruction are simultaneously decoded. This technology is called the "third prior art" hereinafter in which, in a processor configured to simultaneously interpret and execute two or more instructions, when both an arithmetic and logic operation instruction and an inter-register copy instruction are simultaneously decoded, as described above, both the specified arithmetic and logic operation and specified operation of copying data are performed in the same execution phase. The conventional technologies disclosed in the first to third prior arts have the following problems.

The above first prior art is not applicable to an information processing device configured to provide an instruction for updating only a partial block of data such as an instruction for a mask arithmetic and logic operation.

The instruction for a mask arithmetic and logic operation denotes an instruction for controlling an arithmetic and logic operation in accordance with a mask bit corresponding to data element in a one-to-one relationship. For example, an arithmetic and logic operation is performed on an element whose mask bit has been set to "1" and its result is written in a corresponding position in a destination register, whereas neither the arithmetic and logic operation nor operation of writing of the result are performed on an element whose mask bit has been set to "0". In this case, the corresponding elements continue to hold a value assigned before the execution of an instruction as it is.

According to the first prior art, actually only one copied data entity exists. In the example shown in FIG. 15, a case where the instruction for an arithmetic and logic operation (2) is an instruction for a mask vector operation is explained. It is expected that, after termination of the execution of an instruction for a mask vector arithmetic and logic operation (2), data "Y" is stored in a register R1 and a result (here, defined as "Y-a") from updating of a partial block of data "Y" is stored in a register R2. However, even if the arithmetic and logic operation is performed partially on an entry "1" whose the valid/invalid recording device has been set to "0", since data set before being written remains to be "X/", data stored in the register R2 does not become an expected value "Y-a". On the other hand, when a partial overwriting operation is performed on data stored in an entry "2" of a register file, though data "Y-a" can be obtained as data for the register R2, data "Y" that has to be held in the register R1 is destroyed.

The application of the first prior art to a vector processor causes a problem in that a correct result cannot be obtained when the processor performs the mask arithmetic and logic operation. In the case of the vector processor, in order to prepare for the mask arithmetic and logic operation, actual copying of a data entity is necessary.

According to the second prior art, by way of an instruction, explicit designation of simultaneous execution of an arithmetic and logic operation and a copying operation is required. It is necessary that an instruction set architecture contains a form of designating a plurality of destination registers is essential. Moreover, a compiler has to have a function of integrating an instruction for arithmetic and logic operations and an instruction for inter-register copy operations and converting the integrated instructions into one instruction. There is a case where a branch instruction or a like is inserted between an instruction for arithmetic and logic operations and an instruction for inter-register copy operation and, in this case, optimization of coding by the compiler is difficult.

Moreover, according to the third prior art, only when decode information of two instructions being simultaneously executable is held and, these two instructions have not been executed yet, these two instructions become simultaneously executable. Therefore, it is necessary that these two instructions are provided in a manner to be adjacent and neighboring to each other in an instruction stream, however, in actual instructions, this condition can be satisfied in rare cases.

An object of the present invention is to provide technology, as one of technologies to reduce execution time required for an inter-register copy instruction, being applicable to an information processing device that can provide an instruction for partially updating data such as a vector processor having a function of performing a mask arithmetic and logic operation.

Another object of the present invention is to achieve the above technologies only by modifications of hardware without modifications to the conventional instruction set architecture or the compiler.

Still another object of the present invention is to provide technology to enable reduction of execution time for an instruction for an inter-register copy operation, even when two instructions which used same data (one is an arithmetic and logic operation instruction, another is an inter-register copy operation) appear apart and separately in an instruction stream.

DISCLOSURE OF THE INVENTION

A first information processing device of the present invention to solve the above problems having registers each holding data, an operation device to perform an arithmetic and logic operation on input/output data held in said registers, for performing sequential processing in accordance with instructions, and configuring so as to issue an inter-register copy instruction for copying data being held in one register to another register, including a copy information holding device to store information of a reservation for performing a data copy operation by the inter-register copy instruction, wherein the reservation for performing a data copy operation is stored in the copy information holding device in an execution phase of the inter-register copy instruction and the execution phase is completed without an actual data copy operation.

According to a second information processing device of the present invention, in the above first information processing device, in a decode phase of a succeeding instruction for referencing to a value of a register, a status of a reserved data copy operation stored in the copy information holding device is referenced to and, when coincidence is detected between a register designated as a destination register of a preceding instruction for an inter-register copy operation and a register to be referenced to by the succeeding instruction, both a data copy operation designated by the inter-register copy instruction and an operation designated by the succeeding instruction are simultaneously performed.

According to a third information processing device of the present invention, in the above first and second information processing device, in a decode phase of a succeeding instruction for updating a value of a register, a status of a reserved data copy operation stored in the copy information holding device is referenced to and, when coincidence is detected between a register designated as a copy destination register by a preceding inter-register copy instruction and a register designated as a destination register by the succeeding instruction, if the succeeding instruction is an instruction for updating only part of data held in a register, both a data copy operation designated by the inter-register copy instruction and an operation designated by the succeeding instruction are simultaneously performed and either of results from the execution of two instructions simultaneously executed is selected in accordance with a pattern designated in advance and the selected result is written onto a register for execution results.

According to a fourth information processing device of the present invention, in the above first and second information processing device, in a decode phase of a succeeding instruction for updating a value of a register, a status of a reserved data copy operation stored in the copy information holding device is referenced to and, when coincidence is detected between a register designated by a preceding instruction for an inter-register copy operation as a copy destination register and a register designated as a destination register by the succeeding instruction, if the succeeding instruction is an instruction for writing a new value not depending on data being held in the register at this time point is to be written, the data copy operation reserved by the preceding inter-register copy instruction is cancelled.

According to a fifth information processing device of the present invention, in the above first and second information processing device, in a decode phase of a succeeding instruction for updating a value of a register, a status of a reserved data copy operation stored in the copy information holding device is referenced to and, when coincidence is detected between a register designated as a copy source by a preceding inter-register copy instruction and a register to be updated by an operation by the succeeding instruction, the data copy operation reserved by the inter-register copy instruction is immediately executed.

According to a sixth information processing device of the present invention, in a decode phase of a succeeding instruction for updating a value of a register, a status of a reserved data copy operation stored in the copy information holding device is referenced to and, when coincidence is detected between a register designated by a preceding instruction for an inter-register copy operation as a copy source and a register to be updated by the succeeding instruction, a physical register number designated as a copy source by the inter-register copy instruction is replaced with a register number referenced by a register designated as a copy destination by a register renaming mechanism and a data copy operation designated by the inter-register copy instruction and an operation by the succeeding instruction are simultaneously performed.

According to a seventh information processing device of the present invention, in the above sixth information processing device, if the succeeding instruction is an instruction for updating only part of data held in a register, either of results from execution of two instructions simultaneously executed is selected in accordance with a pattern designated in advance and is written in a register.

According to an eighth information processing device of the present invention, in the above first information processing device, in a decode phase of the inter-register copy instruction, only when immediate execution of said inter-register copy operation has been instructed by the instruction, an actual data copy operation is immediately performed without reserving execution of a data copy operation.

According to a ninth information processing device of the present invention, in the above first to eighth information processing device, wherein the copy information holding device stores information of a reservation of performing a data copy operation by the inter-register copy instruction includes a unit to obtain a register number designated as a copy destination from a register number designated as a copy source and a unit to obtain a register number designated as a copy source from a register number designated as a copy destination.

According to tenth to eighteenth information processing devices of the present invention, the same configurations employed in the first to ninth information processing device are applied to a vector processor having a vector register, a vector operation device, and providing an instruction for a mask arithmetic and logic operation.

A first instruction execution method of the prevent invention to be applied to an information processing device having registers each holding data and an operation device to perform an arithmetic and logic operation on input/output data held in the registers and a function for simultaneously performing both an inter-register copy instruction and an arithmetic and logic instruction, the method including storing reservation information about the inter-register copy instruction onto a copy information holding device in an execution phase of the inter-register copy instruction and simultaneously executing an operation performed by a succeeding instruction and a data copy operation performed by the inter-register copy instruction in an execution phase of the succeeding instruction using a same register as designated by the inter-register copy instruction stored in the copy information holding device.

According to a second instruction execution method of the present invention, in the above first instruction execution method, there is provided a step of making a judgment as to which condition out of the following conditions (a) to (c) a relation between an operation designated by the succeeding instruction and an operation designated by the preceding inter-register copy instruction is applied to, the conditions including (a) that a register to be updated by the succeeding instruction coincides with a register to be updated by the preceding inter-register copy instruction and the succeeding instruction is an for updating only part of data being held in the register, (b) that the condition (a) is not satisfied and a register referenced to by the succeeding instruction coincides with a register referenced to or updated by the preceding inter-register copy instruction, and (c) that the conditions (a) and (b) are not satisfied and a register to be referenced to by the succeeding instruction coincides with a register to be referenced to by the preceding inter-register copy instruction, a step of, when said condition (a) is satisfied, simultaneously performing an operation designated by the succeeding instruction and a data copy operation by the preceding inter-register copy instruction and of writing either of results from the two operations according to a pattern designated in advance, a step of, when the condition (b) is satisfied, simultaneously performing an operation designated by the succeeding instruction and a data copy operation by the preceding inter-register copy instruction, and a step of, when the condition (c) is satisfied, the operation designated by the succeeding instruction is performed after the data copy operation by the preceding inter-register copy instruction is performed.

According to the third instruction execution method of the present invention, in the above second instruction execution method, there is further provided a step, when the condition (c) is satisfied, of changing a register to be updated by the succeeding instruction to a register to be updated by the preceding inter-register copy instruction instead of executing the succeeding instruction after the execution of a data copy operation by the preceding inter-register copy instruction and a step, if the succeeding instruction is an instruction for updating only part of data being held in a register, of simultaneously performing both an operation designated by the succeeding instruction and a data copy operation by the preceding inter-register copy instruction and a step, if the succeeding instruction is an instruction for writing a new value without dependence on data being held in a register, of executing only the succeeding instruction and, by using a register renaming function and of swapping a physical register name to be referenced to by the preceding inter-register copy instruction with a physical register name to be updated.

According to the fourth instruction execution method of the present invention, in the above second or third instruction execution method, the register is a vector register, the operation device is a vector operation device, and an instruction for updating only part of data being held in the vector register is an instruction for a mask arithmetic and logic operation.

The information processing device of the present invention is equipped with a copy information holding device to reserve the execution of a data copy operation and is configured to register reserving of the data copy operation in the execution phase of an inter-register copy instruction. Moreover, the information processing device, when a register is referenced to or updated at the execution of a succeeding instruction, checks a reservation status of a registered data copy operation and, when data that was destination of data copy operations is used as a source operand of the succeeding instruction, controls so as to simultaneously perform operations designated by the succeeding instruction and reserved data copy operations.

Moreover, when data held in a source register for reserved data copy operations is designated as a destination operand, by the register renaming function, physical register names of source registers for reserved data copy operation and destination registers are replaced with one another and operations designated by a succeeding instruction and reserved data copy operations are simultaneously controlled.

Additionally, when the succeeding instruction is an for updating only part of data designated as an instruction for a mask arithmetic and logic operation, operations designated by the succeeding instruction and reserved data copy operations are executed and writing to a register is controlled according to a mask bit to obtain correct results.

According to the above control, the execution time of an inter-register copy instruction is hidden by synchronizing operations of the inter-register copy instruction and a succeeding arithmetic and logic operation.

According to the present invention, by synchronizing operations of data copy by an inter-register copy instruction and arithmetic and logic operations using the same data as used in the operations of data copy by the inter-register copy instruction, the execution time of the inter-register copy instruction is hidden.

The present invention have the following features unlike the conventional technology. That is, unlike the first conventional technology in which only a label affixed to data is updated, according to the present invention, a data entity is actually copied and, therefore, the invention may be applied to an information processing device providing an arithmetic and logic instruction for updating only part of data such as a vector processor providing an instruction for a mask arithmetic and logic instruction. However, the technology disclosed in the present invention may be applied not only to an information processing device configured to update only part of data such as a vector processor disclosed in the embodiment but also to an ordinarily-used microprocessor.

Unlike the second conventional technology, the method of the present invention can be realized only by hardware modifications without modifications to a conventional instruction set architecture and compiler.

Additionally, unlike the third conventional technology, the present invention, even when an inter-register copy instruction and an instruction for an arithmetic and logic operation appear apart among instructions, can be applied. It is understood by those skilled in the art that objects, aspects, and advantages of the above invention and other inventions now will be described more fully hereinafter with reference to detailed descriptions in which the invention has been described in its preferred form that falls within the scope of the present invention and to the accompanying drawings.

BRIEF DESCRIPTION OF DRAWINGS

FIG. 2 is an example of configurations of a copy information holding device according to the first embodiment of the present invention.

FIG. 4 is a diagram showing examples of instructions to be executed in the first embodiment of the present invention.

FIG. 5 is a diagram showing examples of operations to be performed by a control unit for making a reference to and updating information held in a copy information holding device of the present invention.

FIG. 15 is a diagram explaining operations of reducing execution time in an inter-register copy instruction in the conventional information processing device.

BEST MODE FOR CARRYING OUT THE INVENTION

Embodiments of the present invention are described below by referring to drawings. The application of the technology disclosed in the present invention is not limited to a vector processor, however, in order to explain clearly that the technology has solved the problem related to the above first conventional prior art, explanation is made by taking a vector processor as an example.

(First Embodiment)

Figure 1:
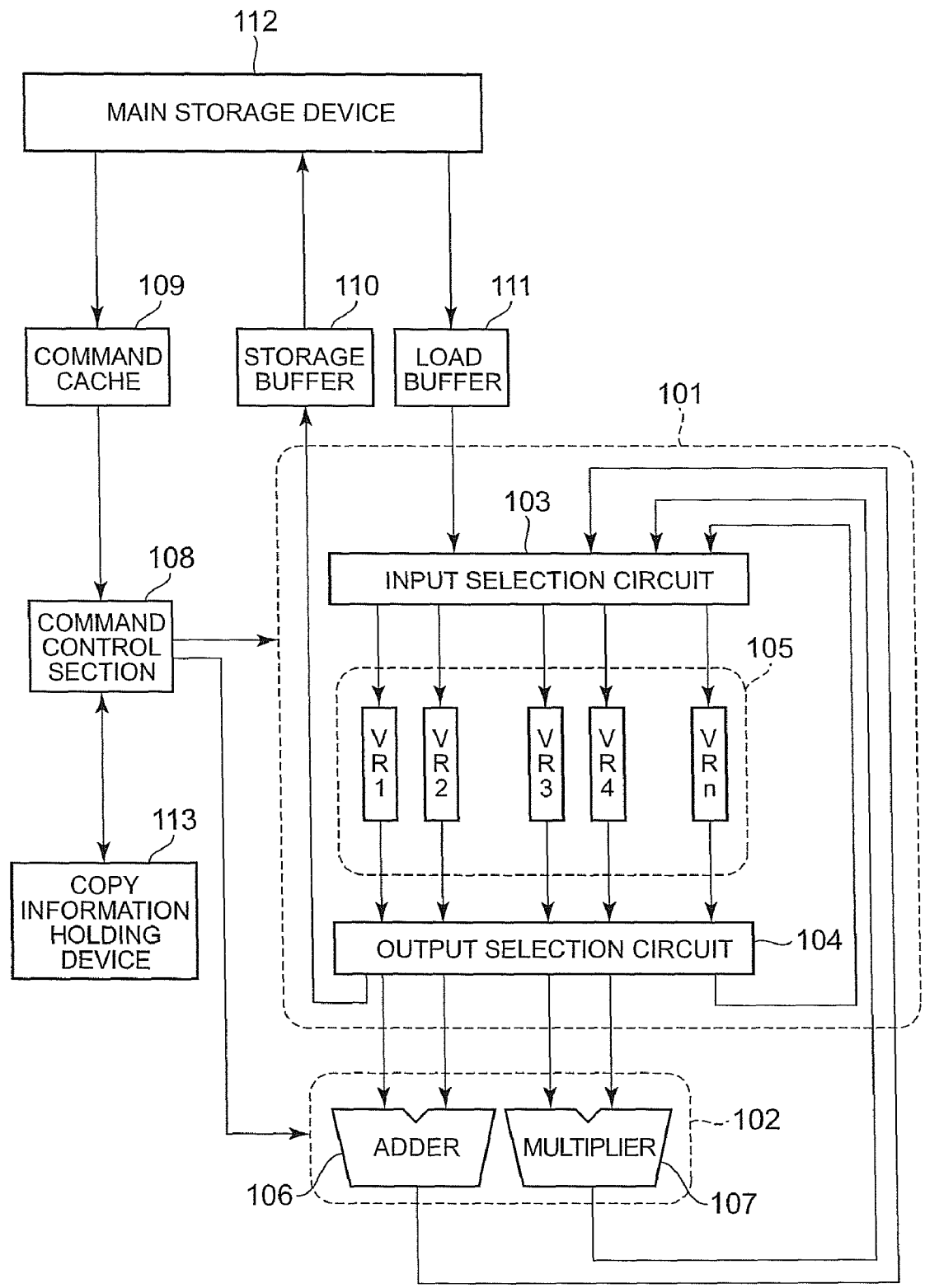
FIG. 1 is a block diagram showing configurations of main functional sections of an information processing device according to the first embodiment of the present invention.

FIG. 1 is a block diagram showing configurations of main functional sections of the information processing device of the first embodiment of the present invention. The control unit 108 sequentially decodes and executes instructions read from the instruction cache 109. The operation device 102, with its input and output ports being connected to the register file 101, receives input data from a specified register 105 in accordance with an instruction from the control unit 108 and again writes a result from an arithmetic and logic operation onto the specified register 105. Also, the control unit 108 instructs data to be transferred between the register 105 and the main memory device 112 in some cases. In this case, the control unit 108 performs processing of reading data via the load buffer 111 from the main memory device 112 to write the data onto a specified register 105 and/or of writing data held in the register 105 via the store buffer 110 onto the main memory device 112.

The output selection circuit 104 can select an output from one or more given registers 105 and outputs it to one or more given circuits out of the operation device 102, input selection circuit 103, and store buffer 110 in accordance with an instruction from the control unit 108, while the input selection circuit 103 can select an output from one or more given circuits out of the output selection circuit 104, operation device 102, load buffer 111 and outputs it to one or more given registers 105 in accordance with an instruction from the control unit 108. The control unit 108 simultaneously performs both an inter-register copy operation and an arithmetic and logic operation by controlling the selecting operation in the output selection circuit 104 and input selection circuit 103.

The information processing device of the present invention further has a copy information holding device 113 which holds information about the execution of inter-register copy instructions. The information processing device controls operations of the register file 101 and operation device 102 by making a reference to or updating the information held in the copy information holding device 113.

Data held in the copy information holding device 113 is described by referring to FIG. 2. FIG. 2 shows an example of a means of realizing the copy information holding device 113. In the example, the copy information holding device 113 is made up of two tables including a copy reservation table 201 and a data referencing table 202.

The copy reservation table 201 has entries having the same number as registers that can be designated by an instruction set and each entry corresponds to a register number in a one-to-one relationship. The copy source register reserve bit 203 shows whether or not an inter-register copy instruction designating data held in a register having a register number corresponded to by an entry as a source operand has been issued. When the copy source register reserve bit 203 is set, a register number designated as the destination operand in a data copying operation already reserved is recorded in an entry for the copy destination register number 204.

The data referencing table 202 has entries having the same number as registers that can be designated by an instruction set and each entry corresponds to a register number in a one-to-one relationship. The copy destination register reserve bit 205 shows whether or not an inter-register copy instruction designating data in a register having a register number corresponded to by an entry as a source operand has been issued. When the copy destination register reserve bit 205 is set, a register number designated as a destination operand for a data copying operation already reserved is recorded in an entry for the reference register number 206.

The copy information holding device 113 is a device to hold information about inter-register copy instructions which have been issued and for which data copy operations have not yet been performed. Only if the source register number designated in the inter-register copy instruction can be referenced to a destination register number or vice versa, a method for the achievement is not limited to the method described in the embodiment of the present invention.

Next, operations in the embodiment of the present invention are explained with an emphasis on operations of the control unit 108 to make a reference to or update information held in the copy information holding device 113.

Figure 3:
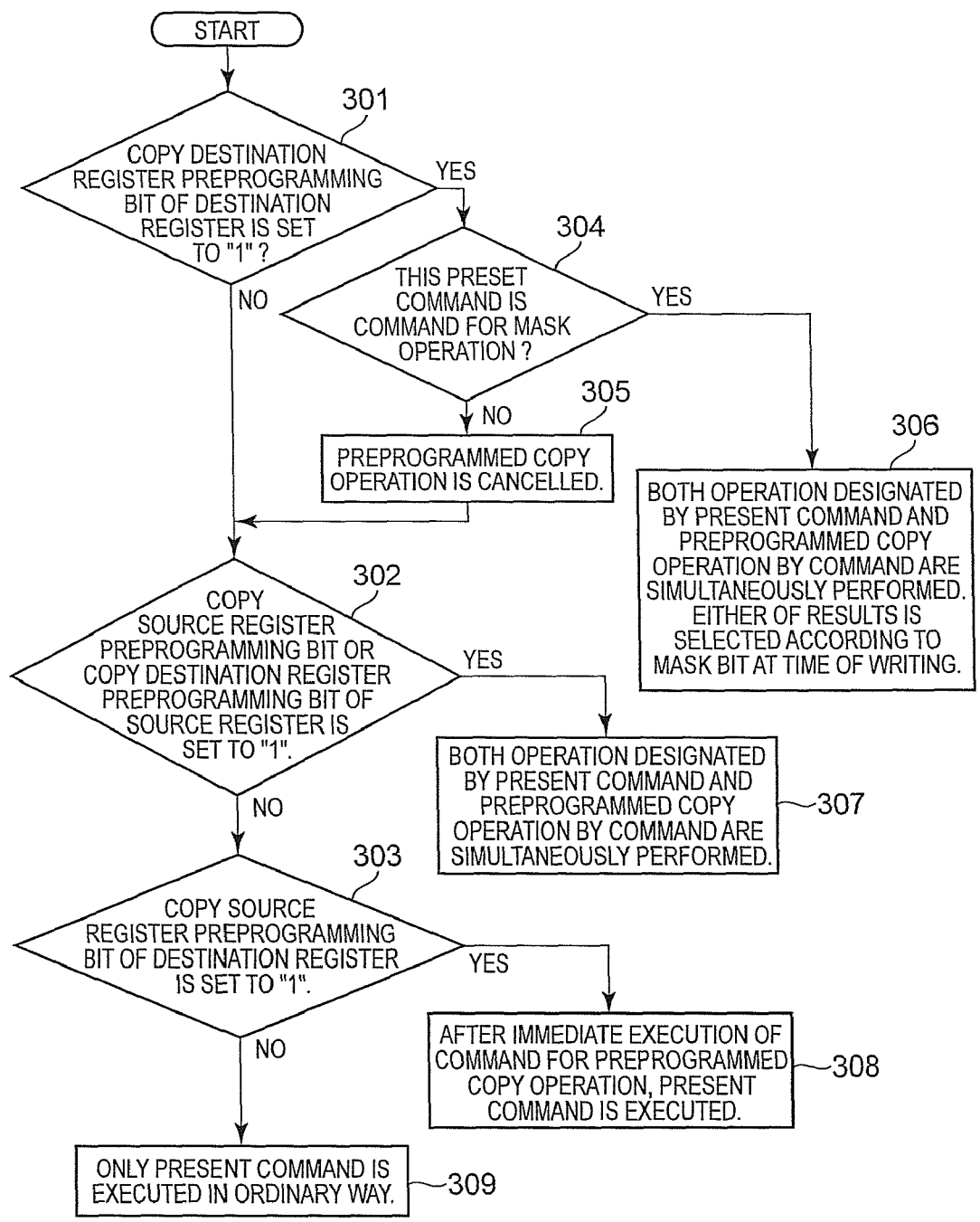
FIG. 3 is a flowchart explaining processing of making a reference to and updating information held in the copy information holding device to be performed by a control unit in a decode phase.

First, processing performed by the control unit 108 before its execution (that is, in a decode phase) of an instruction for making a reference to and updating a register is explained. FIG. 3 shows operations of the processing in the decode phase, in which only operational portions related to the referencing and updating of information held in the copy information holding device 113, which constitutes the characterizing portion of the present invention, are described. Descriptions of the portions other than described above are omitted since their operations are equivalent to those of an ordinarily-used processor.

First, in the state 301, the control unit 108 checks the copy destination register reserve bit 205 in the entry corresponded to the register designated as a destination operand. When the copy destination register reserve bit 205 is set to "0", a transition from the state 301 to 302 takes places and, when being set to "1", the transition to the state 304 takes place.

In the state 304, whether or not the instruction is an instruction for a mask arithmetic and logic operation is checked (clearly, this judgment is peculiar to a vector processor and, therefore, this process is omitted when the present invention is applied to an ordinarily-used microprocessor). When the instruction is an instruction for the mask operation, a transition to the state 306 takes place and, when being not the mask operation, the transition to the state 305 takes place.

In the state 306, both an operations designated by the present instruction and a reserved data copy operation by a reserved instruction for an inter-register copy instruction are simultaneously performed. More specifically, data is output from the register 105 recorded in the entry corresponded to a register designated as a destination operand for the instruction of the reference register number 206, and is input via the output selection circuit 104 to the input selection circuit 103. Moreover, the present instruction for arithmetic and logic operations are simultaneously executed and the results (from the arithmetic and logic operation) are also input to the input selection circuit 103. In the input selection circuit 103, either of data being an object of a data copy operation or result data from the arithmetic and logic operation is selected according to a mask bit (not shown), and the selected data is written onto the destination register designated by the present instruction.

In the state 305, the result from the previously reserved instruction for an inter-register copy operation is overwritten by the present instruction and, therefore, the previously reserved data copy operation is cancelled. More specifically, the copy destination register reserve bit 205 is reset to "0" and the copy source register reserve bit 203 of the entry of register number recorded in the entry for the reference register number 206 is reset to "0". Thereafter, a transition to the state 302 takes place.

In the state 302, checking is made as to whether or not the copy source register reserve bit 203 and the copy destination register reserve bit 205 of the register number designated by the present instruction as a source operand are set to "1". If either of the bit 205 or 203 is set to "1", a transition to the state 307 takes place, while, if both being set to "0", a transition to the state 303 takes place.

In the state 307, both an operations designated by the present instruction and a reserved data copy operation by a reserved instruction for an inter-register copy instruction are simultaneously performed. More specifically, when the copy source register reserve bit 203 of a source register is set to "1", data read from the source register is used for the execution of the present instruction and, at the same time, the read data is written via the output selection circuit 104 and input selection circuit 103 onto the register designated by the number recorded in an entry for the copy destination register number 204. Also, when the copy destination register reserve bit 205 of a source register is set to "1", data (copy source data) read from the register 105 specified by the reference register number 206 of the source register is used for the execution of the present instruction and, at the same time, the read data is written onto the register 105 (destination register of the reserved inter-register copy instruction) designated as a source register by the present instruction.

In the state 303, checking is made as to whether or not the copy source register reserve bit 203 of a register designated by the present invention as a destination operand is set to "1". When being set to "1", a transition to the state 308 takes place and, when being set to "0", a transition to the state 309 takes place.

In the state 308, the present instruction is an instruction for updating the register being a copy source register for the reserved data copy operations. In the embodiment of the present invention, the control unit 108, in order to prevent the copy source register data from being destroyed, controls so as to immediately execute the reserved data copy operations and then the present instruction. When reserved data copy operations are performed, the copy source register reserve bit 203 of the register that was set as a copy source register for the reserved data copy operations and the copy destination register reserve bit 205 of the register that was set as a copy destination register for the reserved data copy operations are reset to "0".

The state 309 shows an ordinary instruction execution phase in which the present instruction is executed.

Next, processing to be performed by the control unit 108 in the execution phase of an instruction for an inter-register copy operation is described (Moreover, the inter-register copy operation is also an instruction for making a reference to a register and, therefore, the processing in the flow chart shown in FIG. 3 has been completed before the execution phase). The control unit 108 makes a reference to and updating information held in the copy information holding device 113 in the execution phase an inter-register copy instruction. More specifically, the copy source register reserve bit 203 of the source register designated by the inter-register copy instruction is set to "1" and the destination register number is recorded in an entry for the copy destination register number 204. Additionally, the copy destination register reserve bit 205 of the destination register designated by the inter register copy instruction is set to "1" and the source register number is recorded in an entry for the reference register number 206.

FIRST OPERATION EXAMPLE

Figure 6:
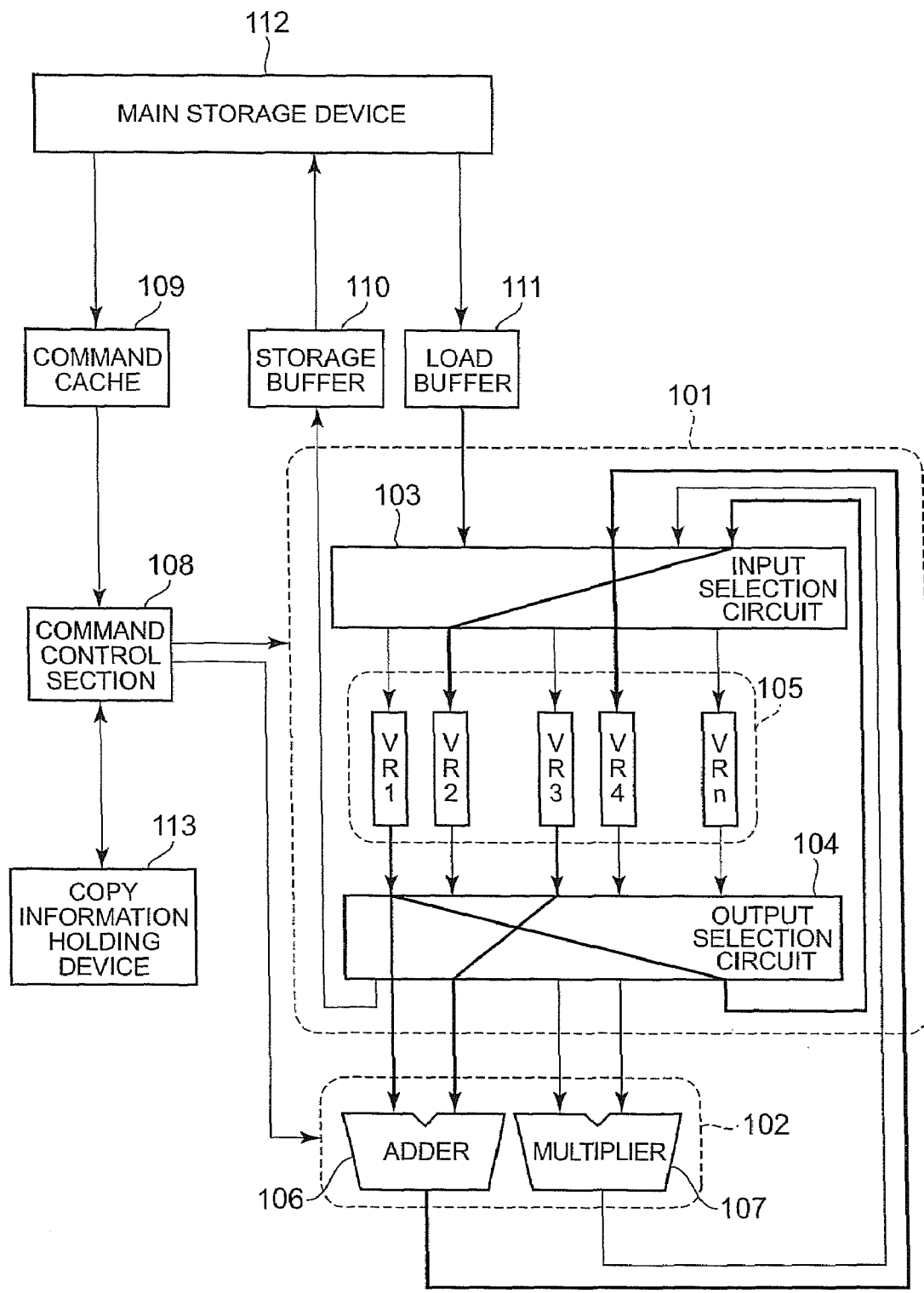
FIG. 6 is a diagram showing data flows in the execution phase of an instruction (2) in the first operation example according to the first embodiment of the present invention.

Operations to be performed when an instruction shown in FIG. 4(*a*) are executed, as the first operation example, are described by referring to FIGS. 5 and 6. FIG. 4(*a*) is a part of instructions to be sequentially executed. FIG. 5 is a diagram showing status of the copy information holding device 113 before and after the execution of the instruction (1). FIG. 6 shows flows of data in the execution phase of an instruction (2).

The instruction (1) is an instruction for an inter-vector register copy operation which instructs each element held in the vector register VR1 to be copied onto each element in the vector register VR2 (in many cases, an instruction for the inter-register copy operations is provided as a move instruction in an instruction set architecture and, therefore, the instruction is indicated as a "MOV" instruction.) The instruction (2) is an instruction for addition among the vector registers which instructs each element in the vector register VR2 to be added to each element in the vector register VR3 and results from the addition to be stored as each element in the vector register VR4.

In an initial state shown in FIG. 5, all of the copy source register reserve bit 203 and the copy destination register reserve bit 205 in the vector registers VR1 to VR4 are set to "0". This means that a data copy operation by an inter-register copy instruction that precedes the instruction (1) are not reserved for the vector registers VR1 and VR2.

The control unit 108 fetches the instruction (1) from the instruction cache 109, and decodes. First, states of the copy source register reserve bit 203 and the copy destination register reserve bit 205 of the source register VR1 and destination register VR2 designated by the instruction (1) are checked. In FIG. 3, transitions of the states 301->302->303->309 take place and only the present instruction are executed in an ordinary way. In the execution phase, as shown in FIG. 5, the state of the copy information holding device 113 is updated. That is, in order to reserve a data copy operation from the source register VR1 to the destination register VR2, the copy source register reserve bit 203 of the VR1 is set to "1" and the copy destination register reserve bit 205 of the VR2 is set to "1". Also, the destination register number 204 and the reference register number 206 are set. The control unit 108 now terminates the execution phase of the instruction (1).

The control unit 108 performs processing of a succeeding instructions (instructions appearing between the instruction (1) and the instruction (2)) in accordance with the flow chart in FIG. 3. It is assumed that, in the instructions appearing between the instruction (1) and the instruction (2), data held in the vector register VR1 and VR2 is not designated as an operand and, therefore, transitions from the state 301->302->303->309 take place and only the present instruction is executed in an ordinary operational way.

Next, operations of the control unit 108 to be performed according to the instruction (2) are described. The vector register VR2 being a destination register of the copy instruction (1) is designated as a source operand of this instruction (2). In the state 301, the copy destination register reserve bit 205 of the destination register VR4 is checked to confirm that the bit 205 has been set to "0", thus causing a transition to the state 302 to take place. In the state 302, the copy source register reserved bit 203 and the copy destination register reserve bit 205 of the source register the VR2 and VR3 are checked. Since the bit 205 of the source register VR2 has been set to "1", a transition to the state 307 takes place and the operation device 102 and the register file 101 are instructed to execute both the instruction (1) and instruction (2).

Data flow in the execution phase of the operation for the instruction (2) is described by referring to FIG. 6. The source operands of the instruction (2) are the vector register VR2 and VR3, the copy destination register reserve bit 205 in the vector register VR2 is set to "1", therefore, the vector register VR specified by the reference register number 206 of the VR2 is read instead for the source operand VR. An output from the vector register VR1 is input to both the adder 106 and the input selection circuit 103 by the output selection circuit 104. An output from the vector register VR3 is input to the adder 106 by the output selection circuit 104. The adder 106 adds input elements from the two vector registers VR1 and VR3 and transmits the result from the addition to the input selection circuit 103. The input selection circuit 103 writes data received via the output selection circuit 104 from the vector register VR1 onto the vector register VR2 and data output from the adder 106 simultaneously onto the vector register VR4. As above, a data copy operation by the inter-register copy instruction and processing of addition by the addition instruction (2) are simultaneously performed and, as a result, execution time of the instruction (1) is completely hidden.

SECOND OPERATION EXAMPLE

Operations to be performed when instructions shown in FIG. 4(b) are executed, as the second operation example, are described. FIG. 4(b) is a part of instructions to be sequentially executed.

Operations for the execution of the instruction (1) are the same as the first operation example. The state of the copy information holding device 113 is updated as shown in FIG. 5(b).

Operations of the control unit 108 to be performed according to the instruction (2) are described. The vector register VR1 being a source register of the copy instruction (1) is designated as a destination operand of the instruction (2). In the state 301, the copy destination register reserve bit 205 of the destination register VR1 is checked to confirm that the bit 205 has been set to "0", thus causing a transition to the state 302 to take place. In the state 302, the copy source register reserve bit 203 and the copy destination register reserve bit 205 of in the source registers VR3 and VR4 are referred to and all the bits 203 and 205 are set to "0" and, as a result, a transition to the state 303 takes place. In the state 303, the copy source register reserve bit 203 of the destination register VR1 is checked to confirm that the bit 203 has been set to "1", thus causing a transition to the state 308 to take place.

The state 308 indicates that the reserved data copy operations and the arithmetic and logic operations of the present instruction can not be simultaneously performed. Therefore, the control unit 108 instructs the data copy operations reserved by the copy instruction (1) to be executed immediately and then executes the instruction (2). In this case, a functional improvement is not seen in the first embodiment (however, in the second embodiment, the functional improvement can be made in this respect.)

In the second operation example, the execution of the data copy operations is delayed, which, on the contrary, causes a risk of decreasing in capability. Therefore, in order to prevent a decrease in capability caused by the delayed execution of the data copy operation, a function of forcing immediate execution of the copy instruction by using software is provided in the embodiment. The control unit 108 is configured so as to interpret and execute two types of instructions, one being an inter-register copy instruction for reserving a data copy operation without actual operations of data copying in an instruction execution phase and another being a forced inter-register copy instruction for immediately performing the copy operation in the instruction execution phase. The software rewrites instructions so that not the inter-register copy instruction but the forced inter-register copy instruction is executed if it is clear that writing onto the source register of the copy instruction is performed by a succeeding instruction after execution of the inter-register copy instruction.

THIRD OPERATION EXAMPLE

Operations to be performed when instructions shown in FIG. 4(c) are executed, as the third operation example, are described. FIG. 4(c) is a part of instructions to be sequentially executed.

The instruction (2) (ADDM) is an instruction for a mask addition among vector registers. The execution of the addition is controlled in accordance with a mask pattern being held in another register. In this example, only elements whose mask bits have been set to "1" in the vector registers VR3 and VR4 are instructed to be added to one another and results from the addition are stored as corresponding elements in the vector register VR2. No change occurs in elements whose mask bits have been set to "0" in the destination register VR2.

The execution for the instruction (1) is the same as that in the first operation example. This causes the state of the copy information holding device 113 to be updated as shown in FIG. 5(a).

Operations of the control unit 108 according to the instruction (2) are explained. In the instruction (2), the vector register VR2 which is the destination register for the copy instruction (1) is designated as a destination operand. In the state 301, the copy destination register reserve bit 205 of the destination register VR2 is checked to confirm that the bit 205 has been set to "1", thus causing a transition to the state 304 to take place. In the state 304, since the instruction is the instruction for a mask arithmetic and logic operation, a transition to the state 306 takes place and the operation device 102 and register file 101 are instructed to simultaneously execute the instructions (1) and (2).

Figure 7:
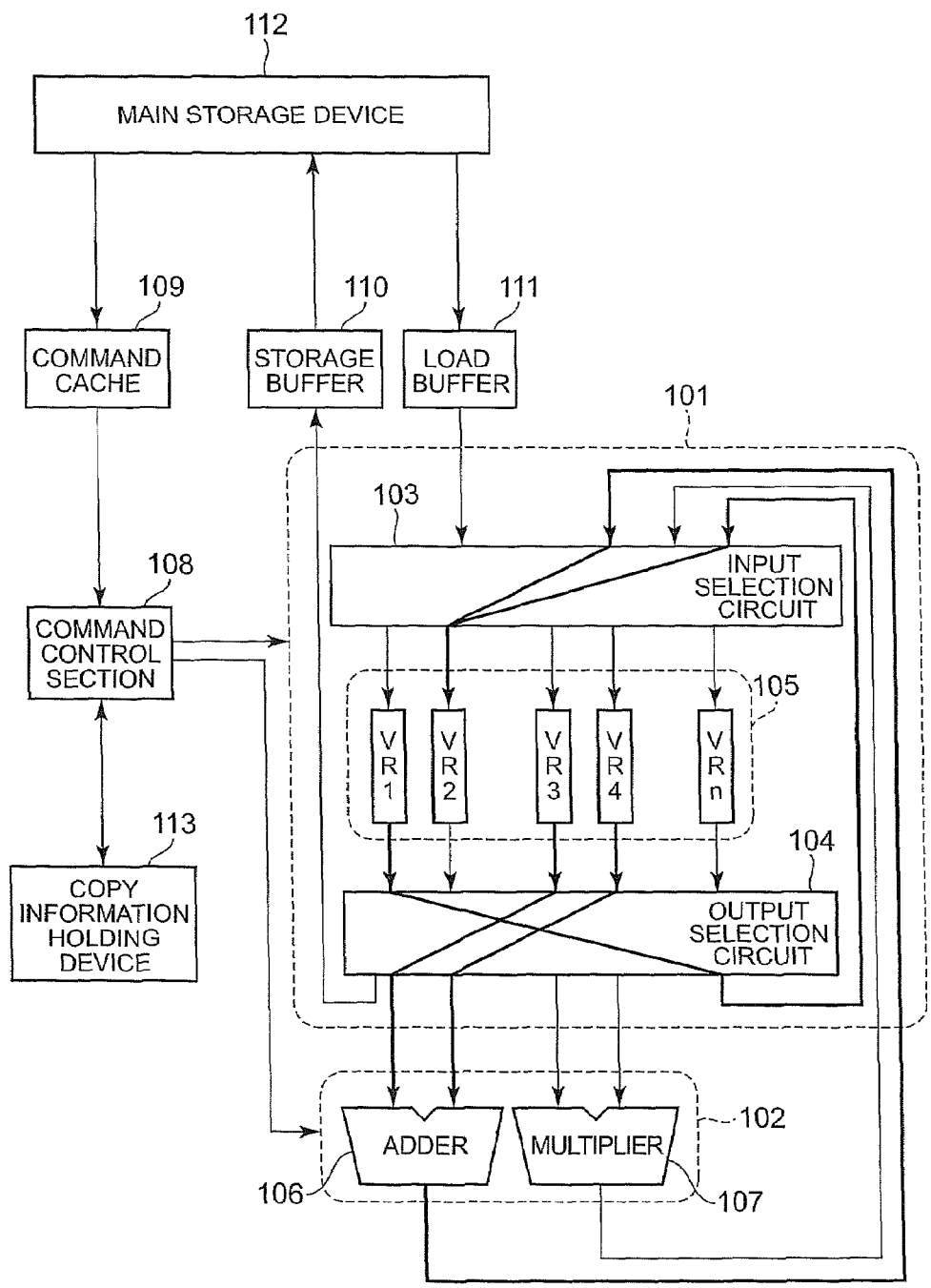
FIG. 7 is a diagram showing flows of data in an execution phase for instruction (2) in the third operation example according to the first embodiment.

Behavior at the time of the execution of the instruction (1) and (2) is described by referring to FIG. 7. The source operand of the instruction (2) is the vector registers VR3 and VR4 and data read from these registers is input sequentially to the adder 106. The adder 106 adds input elements from two vector registers and transmits the result from the addition to the input selection circuit 103. Though data held in the vector register VR2 is a destination operand for the instruction (2), since the copy destination register reserve bit 205 of the VR2 has been set to "1", data held in the vector register VR1 designated by the reference register number 206 of the VR2 is read and input via the output selection circuit 104 to the input selection circuit 103. The input selection circuit 103 waits for data output from the vector register VR1 and data output from the adder 106, selects either of the blocks of data according to a bit pattern stored in a mask register (not shown) and writes the selected data onto the vector register VR2. That is, for an element whose mask bit has been set to "1", an output from the adder 106 is selected and written onto the vector register VR2, while, for an element whose mask bit has been set to "0", an output from the vector register VR1 is selected and written onto the vector register VR2. This allows simultaneous execution of an inter-register copy instruction according to the instruction (1) and instruction for the addition according to the instruction (2), thereby fully hiding execution time of the instruction (1).

(Second Embodiment)

Next, the second embodiment of the present invention is described. According to the second embodiment, the problem of the second operation example that no performance improvement is seen is to be solved by having a register renaming function.

In the second operation example, the problem is shown that, when there occurs coincidence between a copy source register for a reserved data copy operation and a destination register designated by a succeeding instruction, no performance improvement is seen in the first embodiment. In the second embodiment, coincidence of register numbers is avoided by using the register renaming function; that is, each physical register number designated by the copy source register number for a reserved data copy operation and by the copy destination register number for the reserved data copy operation is replaced with one another. Hereinafter, configurations and detailed operations of the second embodiment are described, however, the present invention is not limited to the configurations and operations described therein.

Figure 8:
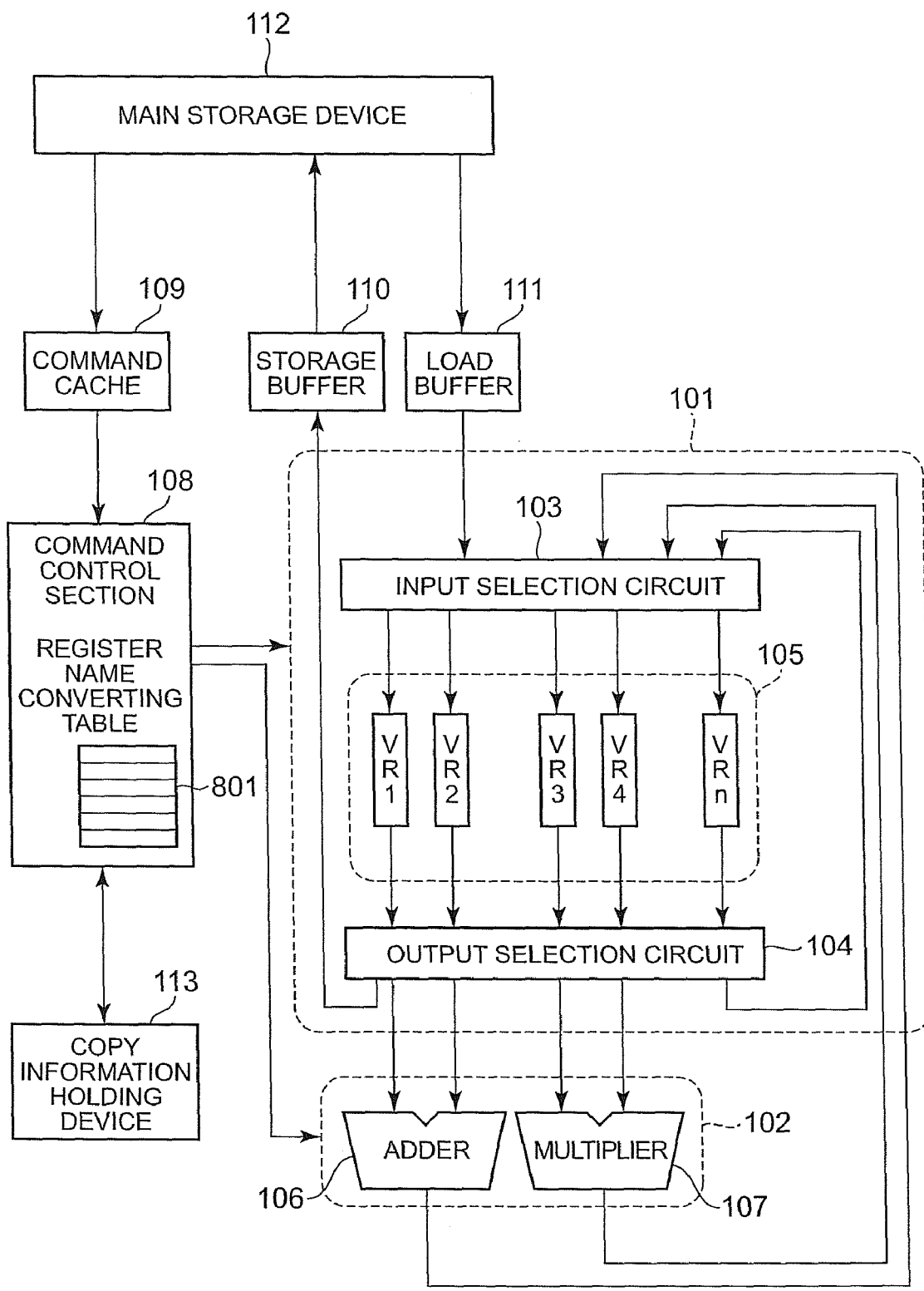
FIG. 8 is a block diagram showing configurations of main functional portions in an information processing device according to the second embodiment of the present invention.

FIG. 8 is a block diagram showing configurations of main functional portions in an information processing device according to the second embodiment of the present invention. Its basic configurations are the same as those in the first embodiment shown in FIG. 1, however, the control unit 108 has a register name converting table 801 therein. The register name converting table 801 is a table used for converting a logical register number designated by an instruction into a physical register number. A physical register number is recorded in an entry designated by a logical register number. When the control unit 108 accesses a register file 105, a conversion from a logical register number to a physical register number is made by the register name converting table 801. The configurations of the copy information holding device are the same as those shown in FIG. 2.

Next, operations in the second embodiment are described.

Figure 9:
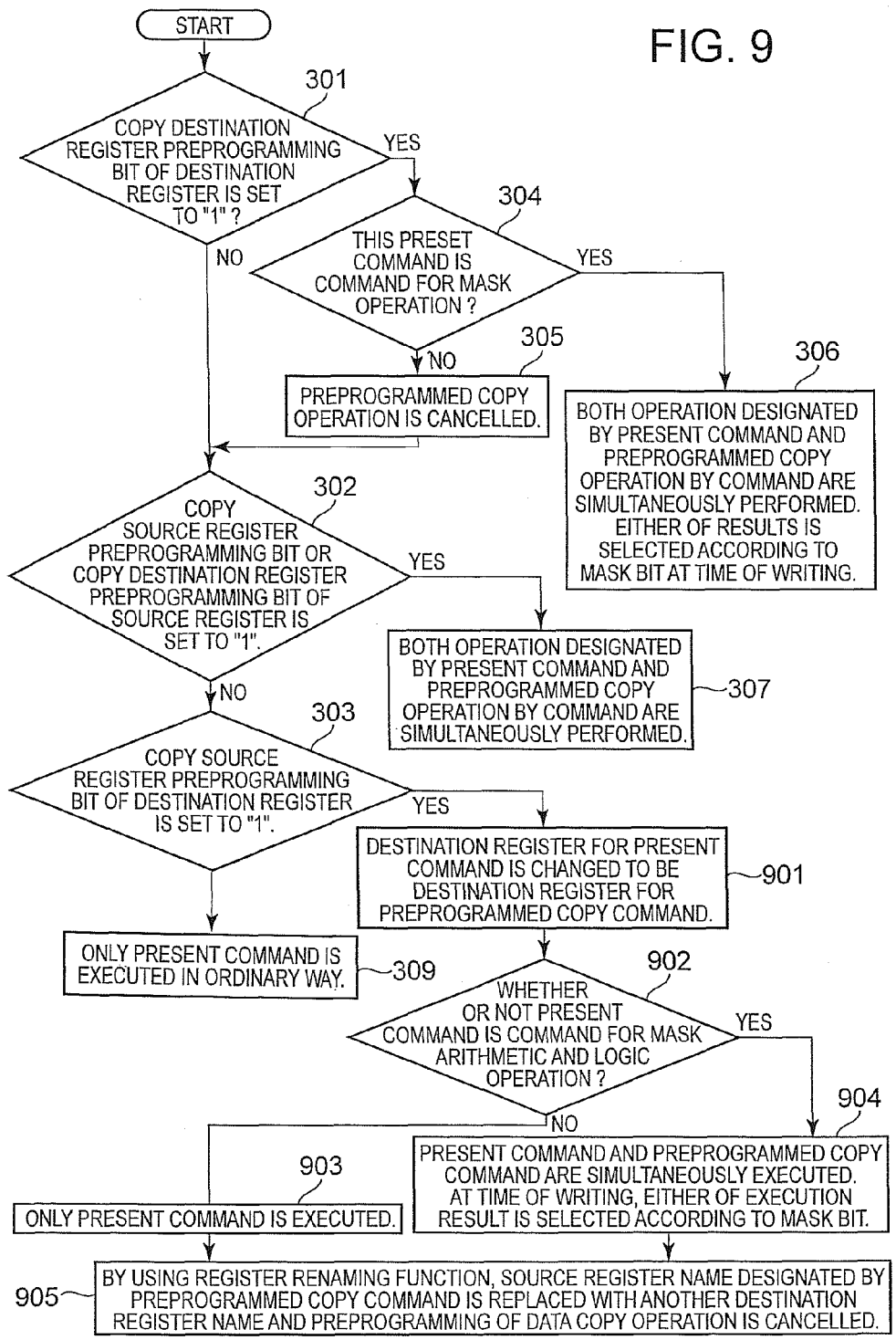
FIG. 9 is a flow chart to be used when a control unit of the second embodiment of the present invention performs processing of making a reference to and updating information held in the copy information holding device in a decode.

FIG. 9 is a flow chart to be used for processing to be performed by the control unit 108 before the execution (that is, in a decode phase) of an instruction for making a reference to and updating information held in a register. As in the case of the flow chart in FIG. 3, only characterizing portions of the present invention are described and descriptions of operations equivalent to those of an ordinarily-used microprocessor are omitted accordingly. As shown in FIG. 9, if the copy source reserve bit is set to "1" in a destination register in the state 303, operations thereafter are different from those of the first embodiment shown in FIG. 3. Hereinafter, only operations different from those in FIG. 3 are explained.

In the state 901, the destination register name designated by the present instruction coincides with a name of a source register for the reserved data copy operation. The control unit 108 reads a register number in an entry of the copy destination number 204 (destination register name of the reserved data copy operation) and rewrites the destination register name of the present instruction being held in the control unit 108 to the destination register name designated by the reserved copy instruction. This causes a register to which a result from an operation by the present instruction to be changed. Thereafter, a transition to the state 902 takes place.

In the state 902, checking is made as to whether the present instruction is an instruction for a mask arithmetic and logic operation (this judgment is peculiar to a vector processor and when the present invention is applied to an ordinary processor, this process is omitted). If the instruction is an instruction for a mask arithmetic and logic operation, a transition to the state 904 takes place and, if not, a transition to the state 903 takes place.

In the state 903, the present instruction is executed. However, the destination register name designated by the present instruction is rewritten in the state 901, the control unit 108 stores results not onto the destination register designated by the instruction but onto the rewritten destination register. In this case, though the reserved data copy operation is cancelled, an entry in the copy information holding device 113 is cleared in the state 905 and, therefore, at this time point, no operation on the copy information holding device 113 is performed.

In the state 904, operations by the present instruction and the reserved data copy operations are simultaneously performed. However, the destination register name designated by the present instruction has been already rewritten in the state 901 and, therefore, the control unit 108 stores results not onto the destination register designated by the instruction but onto the rewritten destination register. The input selection circuit 103 waits for an output result from the data copy operation and an output result from operations by the present instruction, selects either of the outputs of results for every element according to a set mask pattern, and writes the selected one onto the destination register. Another output not selected is destroyed. After the processing, a transition to the state 905 takes place.

In the state 905, the reservation for the data copy operations being held in the copy information holding device 113 is cancelled first. More specifically, for the data referencing table 202, the copy destination register reserve bit 205 of an entry of a destination register number (rewritten in the state 901) designated by the present instruction is reset to "0" and the reference register number 206 is read out. For the copy reservation table 201, the copy source register reserve bit 203 in an entry designated by the reference register number 206 is reset to "0". Next, by using the register renaming function, the source register name and the destination register name of the reserved data copy operation is swapped. More specifically, the control unit 108 first reads the reference register number 206 and the copy destination register number 204 in an entry designated by the reference register number 206. Then, in the register name converting table 801, a value stored in the entry designated by the reference register number 206 and a value stored in an entry designated by the copy destination register number 204 is swapped.

Operations other than described above are the same as those in the first embodiment.

Next, examples of operations in the second embodiment are described.

FOURTH OPERATION EXAMPLE

Figures 10, 11:
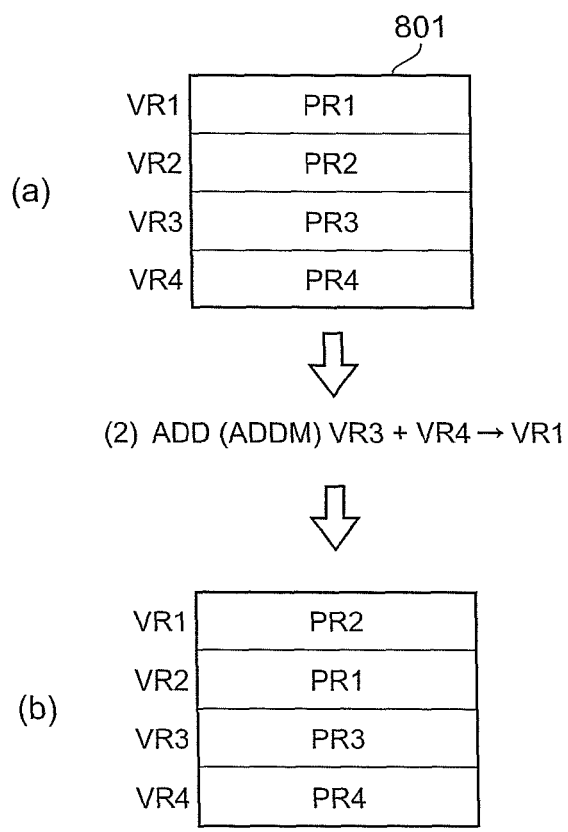
FIG. 10 is a diagram explaining of an operation example for the copy information holding device and register name converting table according to the second embodiment of the present invention.
FIG. 11 is a diagram showing flows of data in the execution phase of the instruction (2) in the fourth operation example according to the second embodiment of the present invention.

Operations to be performed by a instruction (a) shown in FIG. 10 are described as the fourth operation example. The instructions (a) are a part of instructions to be sequentially executed.

Operations to be performed by the instruction (1) are the same as the first operation example. This causes the state of the copy information holding device 113 to be changed to be as shown in FIG. 5(a). Examples of contents of the register name converting table 801 are shown in FIG. 11(a).

Operations of the control unit 108 by the instruction (2) are described. In this instruction, as a destination operand, the vector register VR1 being a source register of the copy instruction (1) is designated. In the state 301, the copy destination register reserve bit 205 is checked to confirm that it has been set to "0", thus causing a transition to the state 302 to take place. In the state 302, the copy source register reserve bit 203 and copy destination register reserve bit 205 of the source registers VR3 and VR4 are referenced to confirm that these bits have been all set to "0" and, as a result, a transition to the state 303 takes place. In the state 303, the copy source register reserve bit 203 of the destination register VR1 is checked to confirm that it has been set to "1" and, as a result, a transition to the state 901 takes place.

In the state 901, the destination register designated by the present instruction is rewritten. The control unit 108 has a means (not shown) to hold a destination register number designated by the instruction (2) being under execution and the holding means holds a register VR1 number as the destination register number designated by the present instruction. The control unit 108 searches for an entry corresponding to VR1 in the copy reservation table 201, reads the register number VR2 stored in the entry of the copy destination register number 204, and changes contents held in the holding means from VR1 to VR2 by rewriting.

Figure 12:
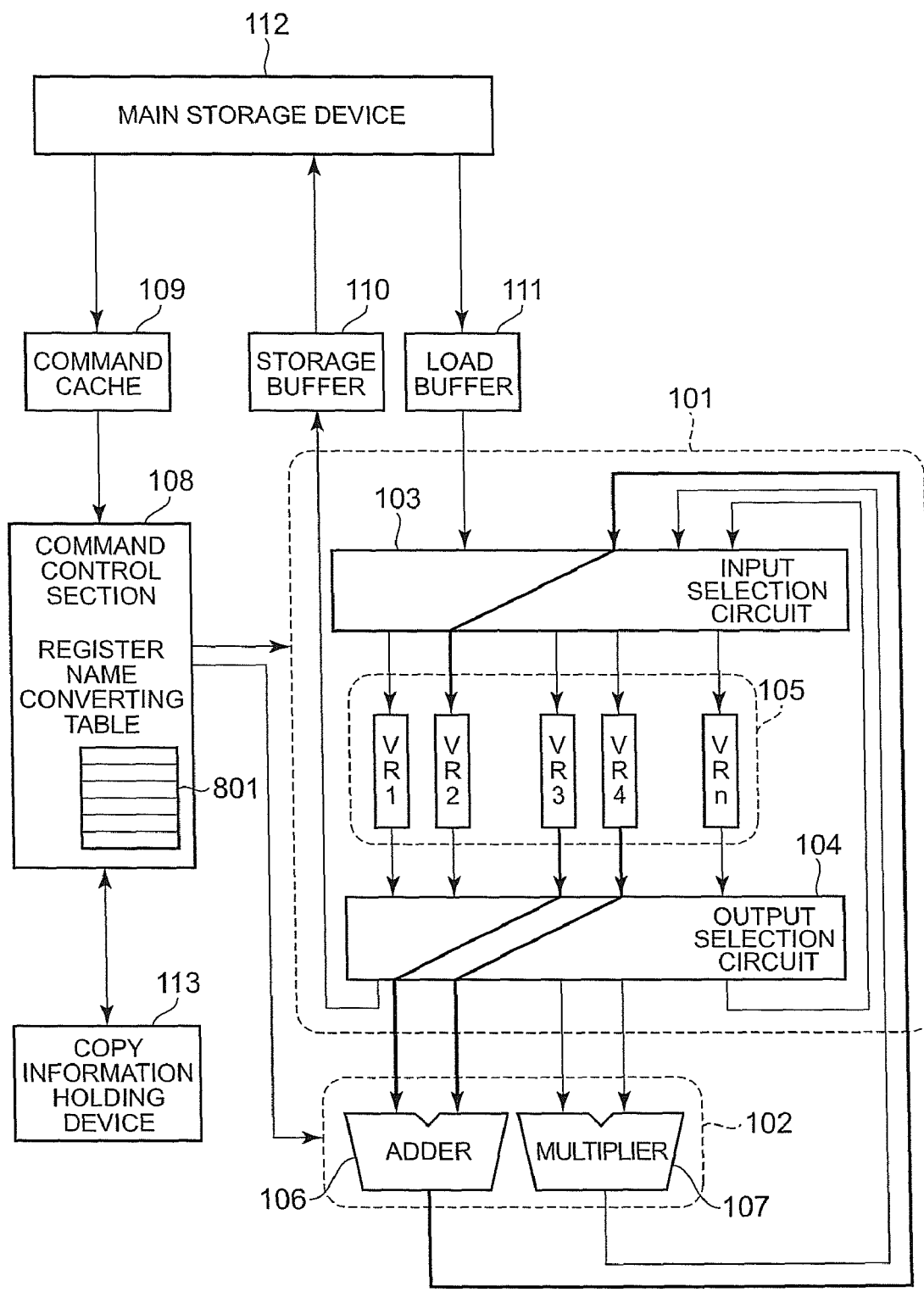
FIG. 12 is a diagram explaining of another operation example of the copy information holding device and register name converting table according to the second embodiment of the present invention.

Since the present instruction (2) is not an instruction for a mask arithmetic and logic operation, a transition from the state 902 to 903 takes place. In the state 903, the present instruction for an arithmetic and logic operation is executed. Flows of data at the time of execution of the instruction (2) are shown in FIG. 12. Though the registers VR3 and VR4 are designated as source operands, the registers VR3 and VR4 are converted into the physical registers having other numbers PR3 and PR4 respectively by the register name converting table 801 (see FIG. 11 [*a*]). The control unit 108 instructs the physical registers PR3 and PR4 to output data and each data element is input via the output selection circuit 104 to the adder 106. The adder 106 performs addition on pairs of elements and inputs the result to the input selection circuit 103. A register to which the result is written by the input selection circuit 103 is designated by the control unit 108. Since data in the register VR2 is designated as a destination operand, the name of the register VR2 is converted to the physical register with the number PR2 and the input selection circuit 103 writes the results from the operations onto the physical register PR2.

After the execution of the present instruction (2), in the state 905, a reservation of the data copy operation held in the copy information holding device 113 is cancelled. First, the copy destination register reserve bit 205 of the destination register number VR1 designated by the present instruction (2) is set to "0" and the register number VR1 is read as the reference register number 206. Then, by using the read VR1 as a key, the copy reserving table 201 is retrieved and the corresponding copy source reserve bit 203 is set to "0" and VR2 is read as the corresponding copy destination register number 204.

Next, the register renaming processing is performed. More specifically, by using the register number VR1 read from the entry for the reference register number 206 and the register number VR2 read from the entry for the copy destination register number 204, information is retrieved from the register name converting table 801 and registered values searched therein are replaced with one another. In this case, in the entry for the register number VR1, its physical register name is changed from PR1 to PR2 by rewriting and in the entry for the register number VR2, its physical register name is changed from PR2 to PR1 by rewriting. This causes contents of the register name converting table to be changed from FIG. 11(*a*) to FIG. 11(*b*).

As a result, results from arithmetic and logic operations performed according to the instruction (2) are stored in the destination register VR1 designated by the present instruction (2) and contents of the register VR1 before the arithmetic and logic operations are stored in the destination register VR2 designated by the reserved inter-register copy instruction (1). At this time point, the execution time for the inter-register copy instruction (1) is hidden by the execution time for the present arithmetic and logic operations.

FIFTH OPERATION EXAMPLE

Operations to be performed by instructions shown in FIG. 10(*b*) are described as the fifth operation example. The instructions shown in FIG. 10(*b*) are extracted part of instructions to be sequentially executed.

Operations to be performed by the instruction (1) are the same as those shown in the first operation example. This causes contents of the copy information holding device 113 to be updated to be as shown in FIG. 5(*b*). An example of the contents of the register name converting table 801 is shown in FIG. 11(*a*).

The instruction (2) (ADDM) is an instruction for a mask inter-vector register addition. The execution of the addition is controlled in accordance with a mask pattern held in another register. In the example, only elements whose mask bits have been set to "1" in the vector registers VR3 and VR4 are instructed to be added to one another and results from the addition are stored as corresponding elements in the vector register VR1. No change occurs in elements whose mask bits have been set to "0" in the destination register VR1.

Operations to be performed by the instruction (2) are described. In this instruction, as a destination operand, the vector register VR1 being a source register of the copy instruction (1) is designated. In the state 301, the copy destination register reserve bit 205 in the destination register VR1 is checked to confirm that it has been set to "0" and, as a result, a transition to the state 302 takes place. In the state 302, the copy source register reserve bit 203 and the copy destination register reserve bit 205 of the source registers VR3 and VR4 are referenced to confirm that all the bits have been set to "0", a transition to the state 303 takes place. In the state 303, the copy source register reserve bit 203 in the destination register VR1 is checked to confirm that it has been set to "1" and, as a result, a transition to the state 901 takes place.

In the state 901, the destination register designated by the present instruction is rewritten. The control unit 108 has a means (not shown) to hold a destination register number designated by the instruction (2) being under execution and the holding means holds a register VR1 number as the destination register number designated by the present instruction. The control unit 108 searches for an entry corresponding to the register VR1 in the data reference table 202, reads the register number VR2 stored in the referencing register number 206, and changes contents held in the holding means from VR1 to VR2 by rewriting.

Figure 13:
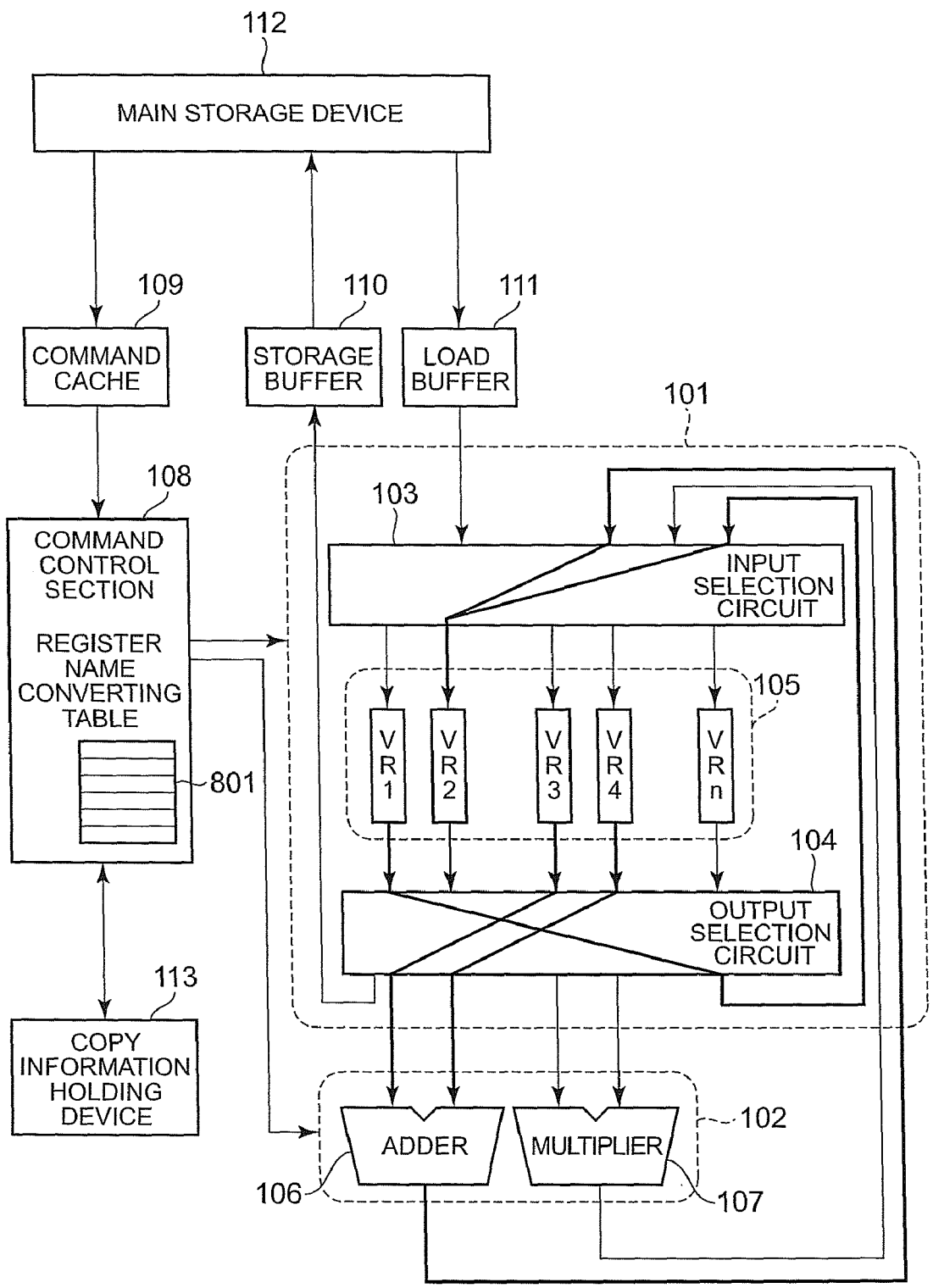
FIG. 13 is a diagram showing flows of data in the execution phase of the instruction (2) in the fifth operation example according to the second embodiment of the present invention.
Figure 14:
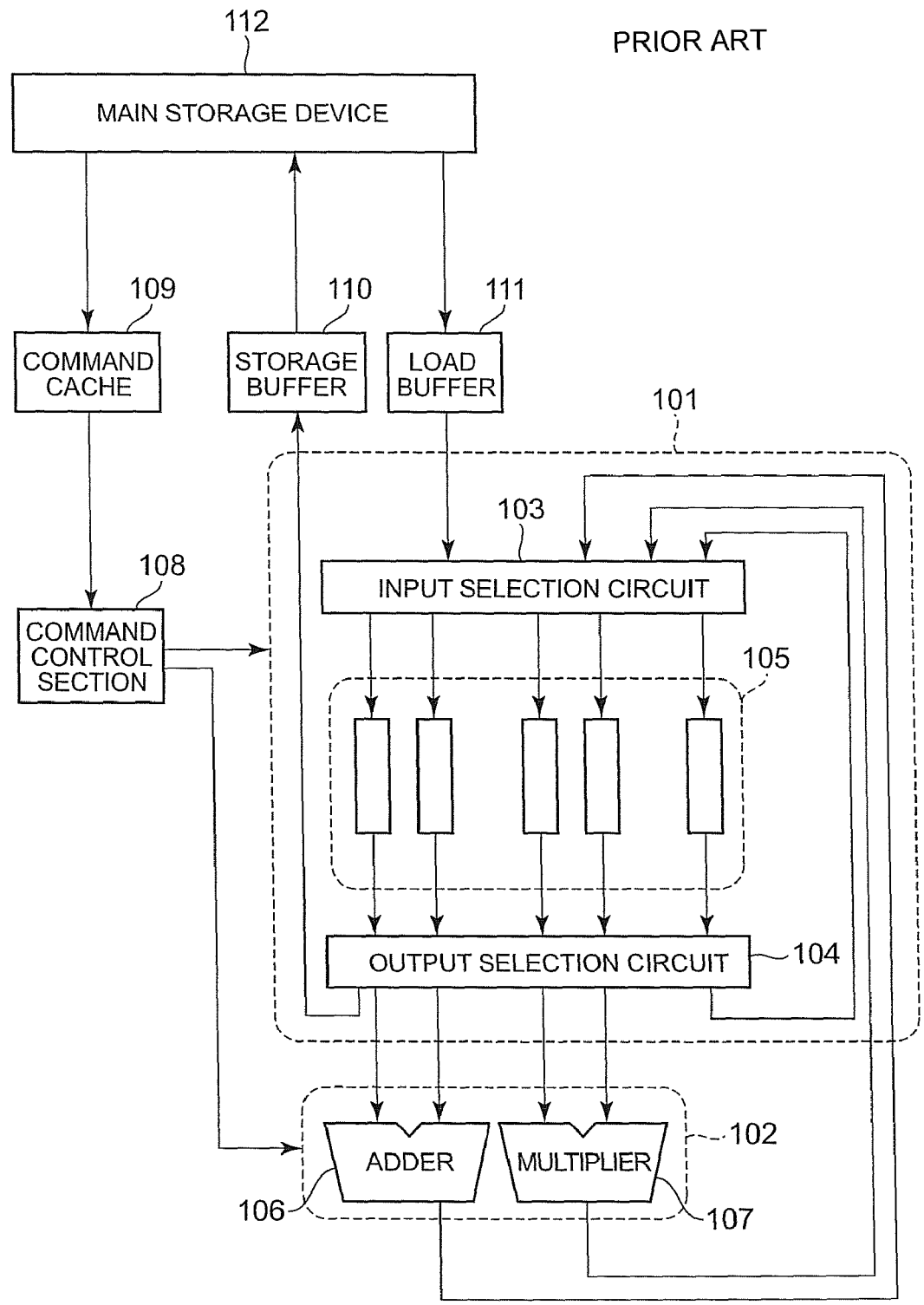
FIG. 14 is a block diagram showing configurations of main functional portions of a conventional information processing device.

Since the present instruction (2) is an instruction for a mask arithmetic and logic operation, a transition from the state 902 to the state 904 takes place. In the state 904, both operations by the present instruction (2) and the reserved data copy operation are performed. Flows of data is shown in FIG. 13. Though, as source operands, data held in the registers VR3 and VR4 are designated, the physical register numbers are converted to PR3 and PR4 by the register name converting table 801 (see FIG. 11 [*a*]). The control unit 108 instructs the physical registers PR3 and PR4 to output data and each element is input via the output selection circuit 104 to the adder 106. The adder 106 performs addition on each pair of elements and outputs results to the input selection circuit 103. On the other hand, the register number VR1 is read from the reference register number 206 corresponding to the destination register number VR2 (already rewritten in the state 901)

designated by the present instruction (2) and operations of copying data read from the register VR1 are simultaneously performed. Due to this, the control unit 108 converts the register number VR1 to the physical register number PR1 using the register name converting table 801 and instructs the register PR1 to output data. The data elements in the register PR1 are input via the output selection circuit 104 to the input selection circuit 103. A register onto which results are written by the input selection circuit 103 is designated by the control unit 108. Since data held in the register VR2 is designated as a destination operand, the register VR2 is converted to the physical register number PR2 by the register name converting table 801. The input selection circuit 103 waits for both the data output from the register PR1 and data output from the adder 106 and selects either of the two blocks of output data for every element in accordance with a bit pattern stored in a mask register (not shown) and writes the selected data onto the register PR2. Another data not written thereto is destroyed.

After having performed operations by the present instruction (2) and the reserved data copy operation, in the state 905, reservation for the data copy operations being held in the copy information holding device 113 is cancelled. First, the copy destination register reserve bit 205 of the destination register number VR2 designated by the present instruction is reset to "0" and the register number VR1 is read as the reference register number 206. Next, by using the register number VR1 as a key, the copy reservation table 201 is retrieved and the corresponding copy source register reserve bit 203 is reset to "0" and the register VR2 is read as the corresponding copy destination register number 204.

Next, the register renaming processing is performed. More specifically, by using the register number VR1 read out from the entry for the reference register number 206 and the register name VR2 read out from the entry for the copy designation register 204, the register name converting table 801 is retrieved and registered values are replaced with one another. In this case, in the entry for the register number VR1, its physical name is changed from the register PR1 to PR2 by rewriting and, in the entry for the register number VR2, its physical name is changed from PR2 to PR1 by rewriting. This causes contents of the register name converting table 801 to be changed from those in FIG. 11(a) to FIG. 11(b).

As a result, in the destination register VR2 designated by the reserved inter-register copy instruction (1) are stored contents before the execution of the arithmetic and logic operations and in the destination register VR1 designated by the present instruction (2) are stored results from the mask arithmetic and logic operations by the instruction (2). At this time of point, the execution time for the inter-register copy instruction (1) is hidden by the execution time for the instruction (2) for the arithmetic and logic operations.

(Third Embodiment)

In the third embodiment, the present invention is made to be applied to a processor that can operate by a SIMD (Single Instruction Multiple Data System) method in which one register holds (n×m)-bit data obtained by coupling a plurality of n-bit data together by m-pieces. The processor capable of operating by the SIMD method can execute an instruction for a mask arithmetic and logic operation allowing a mask control in a unit of n-bit data. In this case, in the third operation example, when a result from a mask arithmetic and logic operation is to be written onto a register, the writing is controlled on each n-bit data in the register in accordance with an m-bit mask pattern. More specifically, the input selection circuit 103 waits for data being an object of operations of the inter-register copy instruction and data on arithmetic and logic operations by the operation instruction. The input selection circuit 103 selects any one of n-bit data in accordance with the m-bit mask pattern and writes the selected data onto the register VR2.

(Fourth Embodiment)

It is not difficult to expand a function of the embodiment of the present invention so as to store a plurality of inter-register copy instructions that designates data held in the same register as a source operand. In this case, the information processing device of the present invention is configured that a plurality of register numbers is recorded in the copy destination register number 204 and data is output to copy destination registers in numbers designated by the input selection circuit 103. The above descriptions are simply examples of the preferred embodiments and the scope of the present invention is not limited to the above. It is understood by those skilled in the art that changes and modifications of the invention may be made without departing from the scope of the present invention.

INDUSTRIAL APPLICABILITY

According to the present invention, by hardware modifications to an ordinary-used processor and by synchronizing the execution of the data copy operation by an inter-register copy instruction and an execution instruction for an arithmetic and logic operation both using the same data as employed in the inter-register copy instruction, execution time of the inter-register copy instruction can be hidden. Moreover, even when the instruction for an inter-register copy operation and the instruction for an arithmetic and logic operation appear apart in instruction stream, the present invention can be applied and, therefore, execution time for the inter-register copy instruction can be reduced. This contributes to high-speed operations of the information processing device.

EXPLANATION OF LETTERS OR NUMERALS

112: Main memory device, 109: Instruction cache, 110: Storage butter, 111: Load buffer, 108: Control unit, 801: Register name converting table, 113: Copy information holding device, 103: Input selection circuit, 105: Register, 104: Output selection circuit, 106: Adder, 107: Multiplier, 102: Operation device

The invention claimed is:

1. A method comprising:
receiving an inter-register copy instruction to copy data of a first register to a second register, the inter-register copy instruction being a vector processing-type instruction;
in response to receiving the inter-register copy instruction, reserving performance of the inter-register copy instruction within a reservation mechanism such that the performance of the inter-register copy instruction is not achieved immediately after the inter-register copy instruction has been received;
after receiving the inter-register copy instruction,
receiving one or more other instructions;
performing the one or more other instructions;
after performing the one or more other instructions, receiving a write instruction related to one or more of the first register and the second register, the write instruction being a mask arithmetic and logic operation instruction that controls an arithmetic and logic operation in accordance with a mask bit in relation to the one or more of the first register and the second register;

in response to receiving the write instruction,
   determining that the performance of the inter-register copy instruction was previously reserved and not yet achieved; and,
   in response to determining that the performance of the inter-register copy instruction was previously reserved within the reservation mechanism and not yet achieved,
      performing the inter-register copy instruction simultaneously with the write instruction, such that the write instruction and the inter-register copy instruction are performed simultaneously even though the write instruction is not immediately adjacent to the inter-register copy instruction in a receiving order, but rather the one or more other instructions separate the write instruction from the inter-register copy instruction in the receiving order, such that execution time required for the inter-register copy instruction is effectively concealed because the inter-register copy instruction is performed simultaneously with the write instruction in that execution time of the write instruction masks the execution time of the inter-register copy instruction where the execution time of the write instruction is at least as great as the execution time of the inter-register copy instruction, and execution of the inter-register copy instruction is intentionally delayed so as to occur simultaneously with execution of the write instruction.

2. An information processing device comprising:
a first register and a second register;
a reservation mechanism; and,
an operation mechanism to:
   receive an inter-register copy instruction to copy data of the first register to the second register, and in response to receiving the inter-register copy instruction, reserve performance of the inter-register copy instruction within the reservation mechanism such that the performance of the inter-register copy instruction is not achieved immediately after the inter-register copy instruction has been received, the inter-register copy instruction being a vector processing-type instruction;
   after receiving the inter-register copy instruction, receive one or more other instructions, and in response to receiving the one or more other instructions, perform the one or more other instructions;
   after receiving the one or more other instructions, receive a write instruction that is a mask arithmetic and logic operation instruction that controls an arithmetic and logic operation in accordance with a mask bit in relation to one or more of the first register and the second register, in response receiving the write instruction, determine that that the performance of the inter-register copy instruction was previously reserved and not yet achieved, and in response to determining that the performance of the inter-register copy instruction was previously reserved and not yet achieved, perform the inter-register copy instruction simultaneously with the write instruction,
      such that the write instruction and the inter-register copy instruction are performed simultaneously even though the write instruction is not immediately adjacent to the inter-register copy instruction in a receiving order, but rather the one or more other instructions separate the write instruction from the inter-register copy instruction in the receiving order, such that execution time required for the inter-register copy instruction is effectively concealed because the inter-register copy instruction is performed simultaneously with the write instruction in that execution time of the write instruction masks the execution time of the inter-register copy instruction where the execution time of the write instruction is at least as great as the execution time of the inter-register copy instruction, and execution of the inter-register copy instruction is intentionally delayed so as to occur simultaneously with execution of the write instruction.

\* \* \* \* \*